2,833,651
METHOD OF MAKING PROTEIN FOOD PRODUCT

Mortimer Louis Anson, New York, N. Y., and Morton Pader, West Englewood, N. J., assignors to Lever Brothers Company, New York, N. Y., a corporation of Maine No Drawing. Application June 3, 1954
Serial No. 434,313

3 Claims. (Cl. 99—14)

This application is a continuation-in-part of our copending application Serial No. 304,844, filed August 16, 1952.

This invention relates to a method of making protein food products which resemble the texture, general appearance and other properties of meat or meat products.

A process for making such food products from animal or vegetable proteins, which are capable of being made into filaments, has been proposed in British Patent No. 699,692 which includes the steps of extruding an alkaline solution or dispersion of the protein through fine orifices into a coagulating bath, usually an acid/salt solution, and applying to the filaments an edible substance which serves to hold the filaments in position in the product.

It has now been found that the above-mentioned meat-like properties may be more closely simulated by converting the filaments formed in the coagulating bath at least partly to a chewy protein gel.

The conversion to a chewy protein gel involves the adjustment of the pH of the protein filaments, which may, but need not, have been stretched, to a value conducive to gel formation on being heated and the subsequent application of sufficient heat to form a chewy protein gel. The term "gel precursor" will be used henceforth to refer to protein filaments in a condition in which at least part of the protein is capable of forming a chewy protein gel on being heated.

The process of the invention is particularly suitable for making food products which simulate not only the texture and chewiness of various kinds of cooked meat or meat products but also their moistness. The process allows products to be made which also simulate the color, general appearance and taste of a variety of kinds of cooked meat or meat products.

Usually, the product also contains substances other than protein filaments, such as dyes, flavoring materials, fat, starch or flour which may be incorporated in order to impart color, flavor or a desired texture to the product. Such additives may be incorporated at one or more stages of the process. Thus, in brief outline, a typical process may comprise the following steps: the preparation of the filaments; the treatment of the filaments with an alkaline agent to convert them to gel precursors; the admixture of additives, for example by passing the gel precursor through a bath containing the desired additives in the form of a liquid; the removal of excess liquid from the mixture of gel precursors and additives, for instance by squeezing; the shaping of the resultant mixture to the shape desired of the product, for example by packing into a can; and the application of heat to the mixture in an autoclave.

In the preparation of protein filaments for use according to the present invention any protein solutions used in the art for the purpose may be employed. Examples of suitable proteins are peanut protein, soy protein and casein. Solutions prepared according to the methods described in copending application Serial No. 357,916, filed May 27, 1953, by Edward Green, Robert W. Graham, Howard S. Gardner and Alan W. Holmes, entitled "Improvements in the Preparation of Protein Solutions," are particularly suitable. Similarly, any solution capable of coagulating the extruded streamlets of protein may be used, provided it is compatible with the subsequent use of the filaments in food products. An aqueous solution at or near room temperature containing sodium chloride and acetic acid is very suitable, about 12% by weight of sodium chloride and about 2% by weight of acetic acid being preferred. The concentrations of electrolyte may, however, vary between wide limits.

The filaments may be converted to gel precursors on emergence from the coagulating bath, but it is usual to interpose one or more steps of treatment after emergence from the coagulating bath and before the conversion to gel precursors. Thus, the filaments may be strengthened in a hot electrolyte solution. Stretching of the filaments, if desired, may be carried out during the strengthening treatment. An aqueous solution at 60° C. containing sodium chloride and acetic acid, frequently in the same concentrations as in the coagulating solution, may, for instance, be used in the strengthening treatment. The filaments are then usually cooled, for example by passing them through an aqueous solution of sodium chloride at or near room temperature.

The pH of the filaments emerging from the coagulating solution is generally below the isoelectric point of the protein. Any subsequent treatment, such as the cooling treatment just described, may raise the pH of the filaments to a limited extent, but not usually to the extent necessary to convert the filaments to gel precursors. The conversion may be effected by treating the filaments with an alkaline agent, such as by immersion in an aqueous solution of sodium hydroxide, carbonate or bicarbonate or like compounds. A suitable method for adjusting the pH of the filaments is that described in copending application Serial No. 408,029, filed February 3, 1954, by James D. Devey, Gordon Kellam and Alan J. MacFarlane, entitled "Improvements in the Manufacture of Protein Filaments."

The pH range to which the filaments are adjusted to convert them into gel precursors may vary with the nature of the protein. The pH should be sufficiently high to ensure that at least some gel formation takes place when the filaments are heated in an autoclave but it should not be high enough to cause the filaments to disintegrate before being heated or to cause them to lose all filamentary character on being heated in an autoclave. There has been observed an increase in the tendency of certain samples of protein towards the development of undesirable color in the gel ultimately obtained as the pH of the gel precursor is raised and too high a pH value may also lead to a certain rubberiness of the gel. The pH is usually adjusted to a value of at least about 6.0, normally between about 6.5 and 7.5. The range between 6.5 and 7.0 is preferred. It is thought that a pH gradient exists inside the gel precursor, the pH increasing from the outside to the inside of the filaments, as a result of which the tendency of the protein to lose its filamentary character upon being heated in an autoclave is reduced. The pH values quoted are average values determined by squeezing a small portion of filaments to remove surplus liquid, immersing the portion in 5 times its weight of distilled water, stirring so as to cause the disintegration of the filaments, allowing the mixture to stand for 5 minutes and then determining the pH of the mixture with a glass electrode. The higher the pH of the filaments within the above range, the higher is the proportion of each filament which will tend to gel. Thus, the value to which the pH of the filaments is adjusted may be used to control the texture of the final product.

Additives may also be used to control the texture of the product. They may serve as anti-fusion agents which reduce the tendency of the protein to lose its filamentary character on being heated in an autoclave, so that the pH of the filaments may, if desired, be raised above the usual ranges or so that the filamentary character of the product may be retained to an increased extent. Coating the filaments with, for instance, a suspension of wheat flour has this effect.

The heating is carried out for a time sufficient to convert the gel precursor to a protein gel. It is preferred to heat the precursor to at least the boiling point of water. This may be done conveniently by subjecting the precursor to steam at super-atmospheric pressure in an autoclave. Heating for about 1 hour at a temperature of about 115° C. with steam at a pressure in the range of 10 to 15 p. s. i. g. has been found to be a satisfactory procedure.

Additives may be incorporated in a food product according to the invention by adding them to the solution, to be extruded, when they will be contained in the filaments, by mixing them with the filaments before the latter are converted to gel precursors, by mixing them with the gel precursors before their conversion to gels or by mixing them with the gelled filaments. It is permissible, and often convenient or desirable, to add one or more additives at one stage and more of the same additive or additives or others at different stages of manufacture. It will be clear, of course, that additives mixed with or incorporated in the filaments before their conversion to gels must be of such a nature or of such proportion as not to interfere with the desired gel formation and all additives must, of course, be compatible with the use of the product as a food product.

The purpose of the additives may be to impart color, flavor or a desired texture to the product. Among such additives there may be mentioned dyes, flavoring materials, fat, starch, flour, and gums. Other additives such as amino-acids or vitamins may serve to improve the nutritional value of the product. Sometimes, an additive or mixture of additives is required to hold the filaments in position in the product.

The length of the filaments in the product will vary with the nature of the product. To make a product simulating a piece of meat, such as roast beef or ham, bundles of filament gel precursors or of gelled filaments may be cut into lengths corresponding to the length of the piece. These may then be treated with whatever additives are desired and may then be assembled together, exerting pressure, if desired. When the gel precursor filaments have been so assembled, the assembly will then be subjected to heating. Conveniently, the assembly may be packed, for instance in cans, and the sealed cans then heated. For products of the luncheon meat type, on the other hand, much shorter lengths of filaments are required. Such products may be made by chopping the filaments before or after their conversion to gel precursors to gelled filaments of the required size, thoroughly mixing the chopped pieces with whatever additives it is desired to add at this stage, shaping the resultant mixture to the desired form and, if required, heating the assembly either before or after packaging. Sausage type products may be made by filling sausage casings with the mixture of chopped pieces and additives.

EXAMPLE 1

*Extraction and separation of protein for filaments*

A commercial, substantially skin-free, oil-free, low temperature solvent-extracted peanut meal was extracted at pH 7.5 with an aqueous sodium hydroxide solution (1 part meal, 9 parts of 0.03% sodium hydroxide solution). The insoluble residue was removed by centrifuging and the protein was then precipitated from the solution at pH 5.0 by the addition of 10 N hydrochloric acid. The precipitated protein was separated by centrifuging.

*Preparation of filaments*

The precipitated protein suspension so obtained was dissolved in aqueous sodium hydroxide and the pH of the solution was adjused to about pH 12.3 by a further addition of sodium hydroxide at which pH the solution was aged for about ten minutes. The pH of the solution was then reduced to about pH 10.8 by the addition of 2 N acetic acid. (An edible dye which will combine with the protein may, if desired, be added to the solution.) The resultant alkaline solution containing about 19% by weight of protein solids was extruded through a battery of six spinnerets (having holes 90 microns in diameter) into a coagulating bath maintained at room temperature which comprised an aqueous solution containing 12% by weight sodium chloride and 2% by weight acetic acid.

*Intermediate treatment of filaments*

The bundles of filaments formed in the coagulating bath were amalgamated into one tow which was guided from the coagulating bath into a strengthening bath comprising a solution similar to that of the coagulating bath but maintained at 60° C. During the strengthening treatment, which was of about 2 minutes duration, the filaments were stretched to double their initial length. The tow was then guided to another bath comprising an aqueous solution containing 5% by weight sodium chloride and maintained at 20° C. and then through squeeze rollers.

*Further processing*

The pH of the filaments was raised to 6.8 by immersion in a buffer solution containing disodium hydrogen orthophosphate and citric acid. The filaments were then passed through squeeze rollers to remove excess solution. The filaments were cut into lengths corresponding to the height of the can into which they were to be packed and were then tightly packed into the can in such a way that the filaments were substantially parallel with the axis of the can from top to bottom. The cans were sealed and then subjected to steam at a pressure of 10 lbs. p. s. i. g. for about 1 hour in an autoclave.

After cooling the contents were removed from the cans and were chopped up into pieces. These pieces can be served in gravy as a stew-like product or the pieces and gravy can be mixed and the mixture canned.

We claim:

1. In the preparation of a protein food product, the steps which comprise adjusting the pH of protein filaments to within the range of 6 to 7.5 and then heating the filaments at a temperature of at least 100° C. to convert them into chewy protein gel.

2. In the preparation of a protein food product, the steps which comprise extruding a plurality of protein filaments into a coagulating bath, adjusting the pH of the filament to within the range of 6 to 7.5, and then heating the filaments at a temperature of at least 100° C. to convert them into chewy protein gel.

3. A method according to claim 2 in which the protein filaments are heated by autoclaving with steam at a temperature of at least 100° C.

References Cited in the file of this patent

UNITED STATES PATENTS

| | | |
|---|---|---|
| 670,283 | Kellogg | Mar. 19, 1901 |
| 869,371 | Kellogg | Oct. 29, 1907 |
| 2,560,621 | Wrenshall | July 17, 1951 |
| 2,682,466 | Boyer | June 29, 1954 |
| 2,730,448 | Boyer | Jan. 10, 1956 |

FOREIGN PATENTS

| | | |
|---|---|---|
| 699,692 | Great Britain | Nov. 11, 1953 |